(12) United States Patent
Sodeno et al.

(10) Patent No.: US 6,318,623 B1
(45) Date of Patent: Nov. 20, 2001

(54) STRIP CONNECTING APPARATUS (75) Inventors: Keiji Sodeno; Masayuki Nakamura; Seiji Kodama; Taketomo Matuzaki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,569

(22) Filed: Aug. 24, 2000

(30) Foreign Application Priority Data

Feb. 25, 2000 (JP) .................................................. 12-049936

(51) Int. Cl.$^7$ .................................................. B23K 15/00
(52) U.S. Cl. .................................. 228/9; 228/12; 228/44.3
(58) Field of Search ............................. 228/9, 12, 8, 44.3, 228/103; 219/97, 100, 101, 104, 158, 161; 29/33 A, 33 B, 33 Q; 269/254 R (56) References Cited

U.S. PATENT DOCUMENTS

| | | | |
|---|---|---|---|
| 3,707,773 | * | 1/1973 | Wolfberg et al. . |
| 3,816,695 | * | 6/1974 | Deffenbaugh . |
| 4,354,089 | * | 10/1982 | Takahashi et al. . |
| 5,053,687 | * | 10/1991 | Merlet . |
| 5,698,118 | * | 12/1997 | Takeda et al. . |
| 5,961,025 | * | 10/1999 | Fukumoto et al. . |
| 5,987,726 | * | 11/1999 | Akeel . |
| 6,152,352 | * | 11/2000 | Isoyama et al. . |

FOREIGN PATENT DOCUMENTS

| | | | |
|---|---|---|---|
| 54-18440 | 2/1979 | (JP) | ................. B23K/37/00 |
| 5-96398 | 4/1993 | (JP) | ................. B23K/37/04 |
| 10-277780 | 10/1998 | (JP) | ................. B23K/37/04 |

* cited by examiner

*Primary Examiner*—Tom Dunn
*Assistant Examiner*—Jonathan Johnson
(74) *Attorney, Agent, or Firm*—Sughrue, Mion, Zinn, Macpeak & Seas, PLLC (57) ABSTRACT

Two position detectors for a leading strip and two position detectors for the trailing strip are provided so as to be separated each other by a certain distance along each of the strips in a transferring direction of the strips to detect a deviation of a center line of each of the strips in a width direction of the strips with respect to a center line of a processing line. Two alignment devices for the leading strip and two alignment devices for the trailing strip, which are provided so as to be separated by a certain distance in the transferring direction, clamp each of the strips and adjust a position of each of the strips in the width direction in response to each of the detected deviations to align the center line of each of the strips with the center line of the processing line.

4 Claims, 6 Drawing Sheets

STRIP CONNECTING APPARATUS

BACKGROUND OF THE INVENTION

1. Field of the Invention

The present invention relates to a strip connecting apparatus, which connects the tail edge of a leading strip and the front edge of a trailing strip.

2. Discussion of Background

Figure 8:
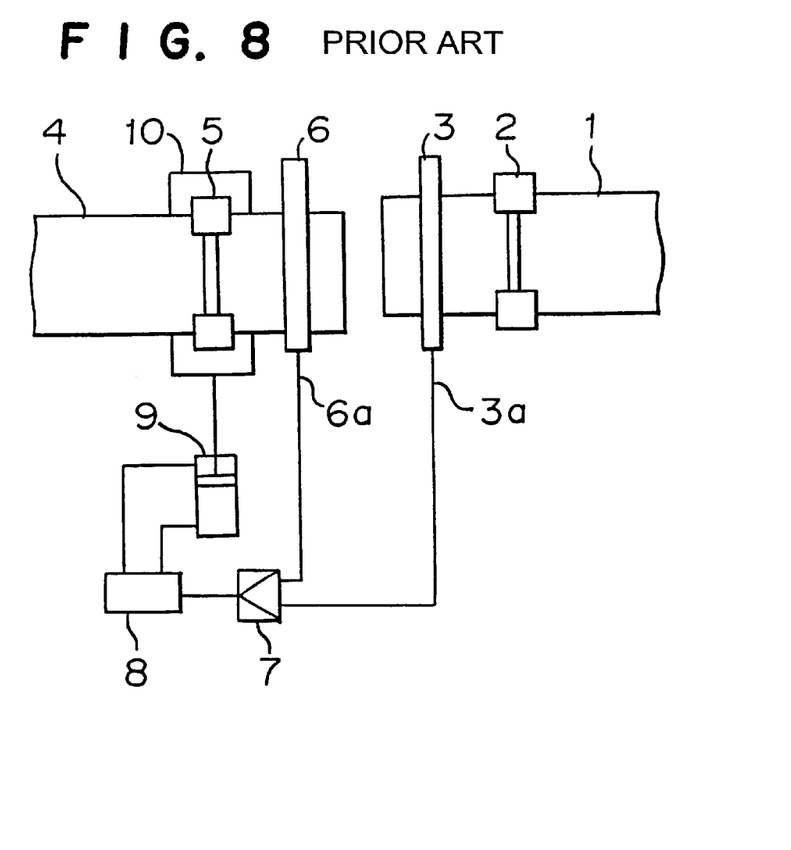
FIG. 8 is a schematic view of a conventional strip connecting apparatus.

In FIG. 8 is shown a schematic view of a conventional strip connecting apparatus, which is disclosed in JP-A-5418440. In FIG. 8, the tail edge of a leading strip 1, which is successively transferred along a processing line, is halted in a welder (not shown). Rough centering of the leading strip 1 is made by clamping the leading strip 1 by an alignment device on the outlet side of the welder. After having clamped the leading strip 1, a position detector 3 detects a deviation between the center of the leading strip 1 in its width direction and the center of the welder (not shown) and outputs a deviation signal 3a.

Next, rough centering of a transferred trailing strip 4 is made by an alignment device 5 on the inlet side of the welder. A position detector 6 detects a deviation between the width center of the trailing strip 4 and the center of the welder (not shown) and outputs a deviation signal 6a. The respective deviation signals 3a and 6a are processed by an operation unit 7 to drive a cylinder 9 through a valve 8. The cylinder 9 is driven to move a table 10 with the trailing strip 4 fixed thereto in a direction transverse to the processing line. When the deviation signals 3a and 6a from the respective position detectors 3 and 6 are matched, the movement of the table 10 is halted. Then, the welder (not shown) connects the tail edge of the leading strip 1 and the front edge of the trailing strip 4 since the respective strips 1 and 4 have had the width centers thereof matched.

Since the conventional strip connecting apparatus is constructed as stated earlier, the connection between the tail edge of the leading strip 1 and the front edge of the trailing strip 4 is carried out in such a state that the leading strip 1 and the trailing strip 4 have the width centers matched. Under the circumstances, it is difficult to ensure the degree of parallel of the center lines of the respective strips 1 and 4 with respect to the center line of the processing line. This creates a problem in that the respective strips 1 and 4 thus connected snake in the processing line when the respective strips are being transferred.

SUMMARY OF THE INVENTION

It is an object of the present invention to eliminate this problem, and provides a strip connecting apparatus capable of preventing connected strips from snaking.

The present invention provides a strip connecting apparatus wherein a leading strip and a trailing strip have centers thereof in a width direction aligned with each other, and the leading strip has a tail edge welded to a front edge of the trailing strip, comprising a position detector for the leading strip and a position detector for the trailing strip, each of the position detectors being provided along each of the strips to detect a deviation of a center line of each of the strips in the width direction with respect to a center line of a processing line; and at least two alignment devices for the leading strip and at least two alignment devices for the trailing strip, the alignment devices for the leading strip and the alignment devices for the trailing strip being provided so as to be separated each other by a certain distance along each of the strips in a transferring direction of the strips, and each of the alignment devices clamping each of the strips and adjusting a position of each of the strips in the width direction in response to each of the detected deviations to align the center line of each of the strips with the center line of the processing line.

Each of the position detector for the leading strip and the position detector for the trailing strip may comprise two position detectors, which are provided so as to be separated each other by a certain distance in the transferring direction.

Each of the position detector for the leading strip and the position detector for the trailing strip may comprise two pairs of position detectors, each pair being provided so as to interpose each of the strips therebetween.

The respective alignment devices may have a pair of pads provided thereon so as to be capable of contacting with both surfaces of each of the strips, the pads being rotatable around an axis perpendicular to the surfaces of each of the strips.

Each of the position detectors may have a contacting piece provided thereon so as to be capable of contacting with a lateral edge of a strip for detection of the deviation, and the contacting piece may have a buffer to absorb impact in the width direction, which is caused when the contacting piece contacts with the lateral edge.

Each of the position detector for the leading strip and the position detector for the trailing strip may comprise a CCD camera.

In accordance with the present invention, the position detectors can detect deviations of the center lines of the leading strip and the trailing strip with respect to the center line of the processing line, and the at least two alignment devices for the leading strip and the at least two alignment devices for the trailing strip can adjust the positions of both strips in response to the detected deviations. Thus, the center lines of both strips can be aligned with the center line of the processing line to prevent the strips from snaking during transfer after connection.

When the alignment devices have a pair of pads provided thereon so as to be rotatable around an axis perpendicular to the surfaces of the relevant strip, the rotational forces that are applied to the relevant strip when aligning the center lines of the strips with the center line of processing line can be absorbed by the rotational pads to prevent the strips from being deformed.

When each of the position detectors has the contacting piece provided thereon, the impact that is when the contacting piece contacts with a lateral edge of the relevant strip can be absorbed to prevent the lateral edge of the relevant strip from being deformed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Embodiment 1

Figure 1:
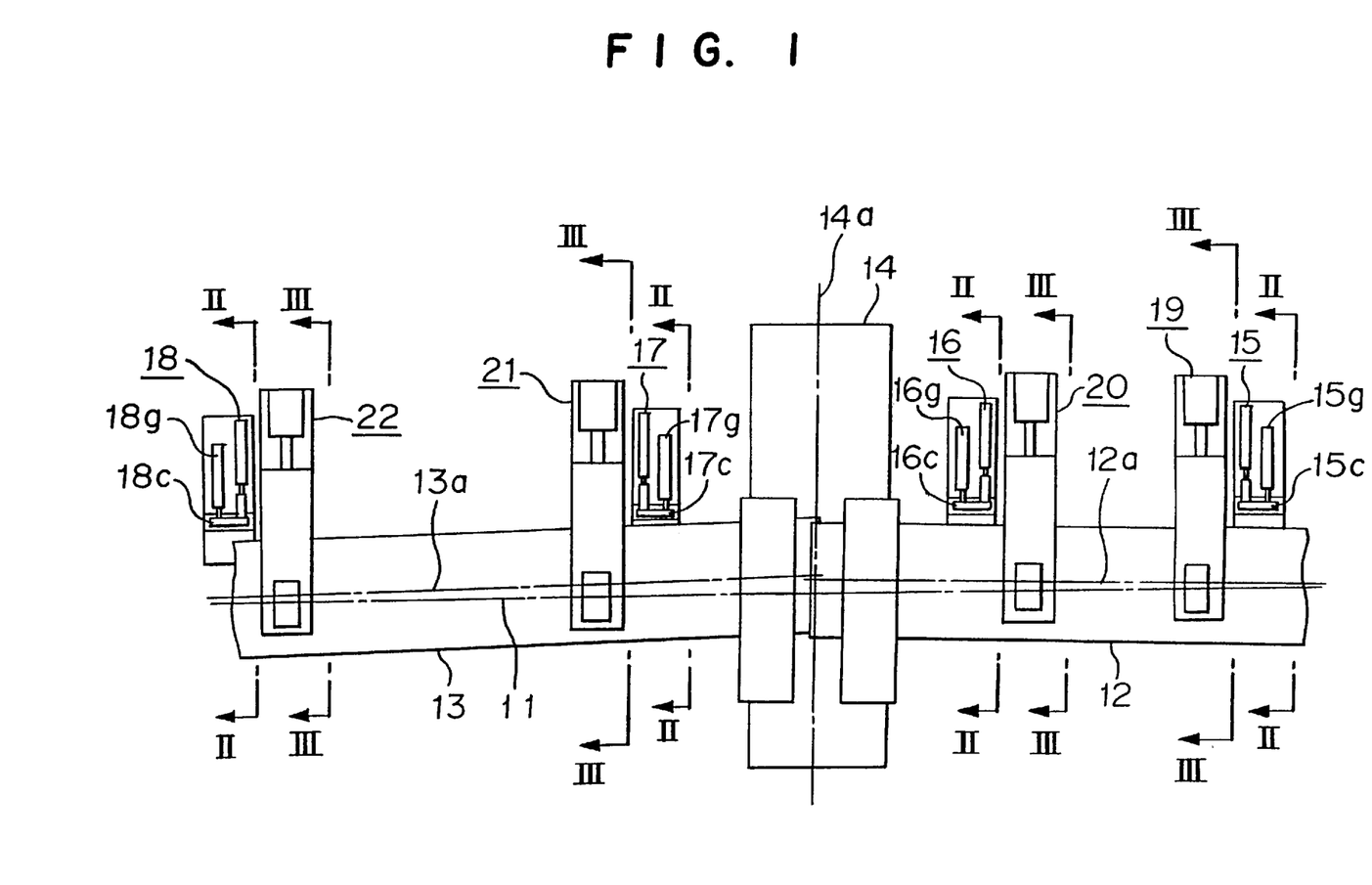
FIG. 1 is a plan view of the arrangement according to a first embodiment of the present invention.
Figure 2:
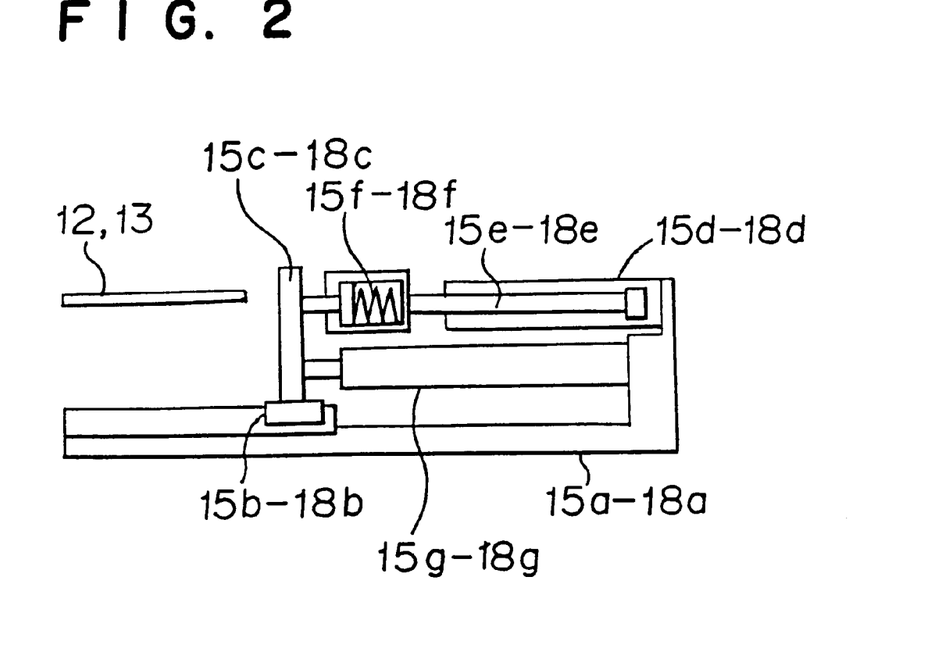
FIG. 2 is a side view taken along a line II—II of FIG. 1.
Figure 3:
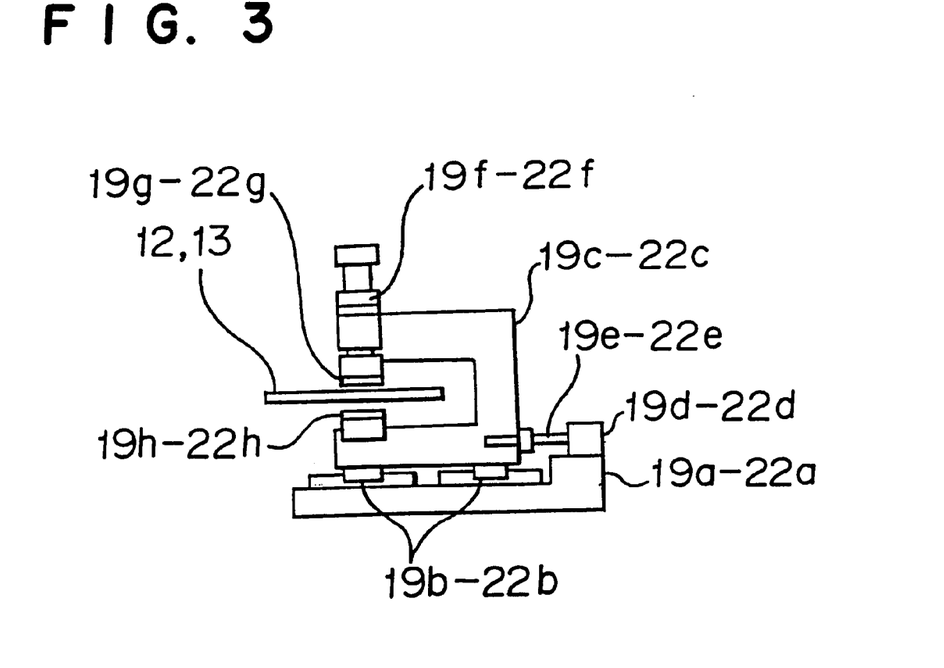
FIG. 3 is a side view taken along a line III—III of FIG. 1 with some portions shown in section.

In FIG. 1 is shown a plan view of the arrangement according to a first embodiment of the present invention. In FIG. 2 is shown a side view taken along a line II—II of FIG. 1. In FIG. 3 is shown a side view of a line III—III of FIG. 1, wherein certain portions are shown in section. In FIGS. 1 through 3, reference numeral 11 designates the center line of a processing line, and reference numeral 12 designates a leading strip, which is transferred in the right direction in FIG. 1, and which is connected to a trailing strip 13 under such a control that the center line 12a of the strip is aligned with the center line 11 of the processing line. Reference numeral 13 designates the trailing strip, which is transferred in the right direction in FIG. 1, and which is connected to the leading strip 12 under such a control that the center line 13a of the strip is aligned with the center lien 11 of the processing line. Reference numeral 14 designates a welder, which is provided to have a connecting position 14a extending perpendicularly to the center line 11 of the processing line, and which connects the tail edge of the leading strip 12 and the front edge of the trailing strip 3 at the connecting position 14a. Reference numerals 15 and 16 designate position detectors, which are provided on the outlet side of the welder 14, and which are separated from each other by a certain distance along the leading strip 12 in the transferring direction of the leading strip 12 in the transferring direction of the leading strip 12. Reference numerals 17 and 18 designate position detectors, which are provided on the inlet side of the welder 14, and which are separated from each other by a certain distance along the trailing strip 13 in the transferring direction of the trailing strip 13. The position detectors 15–18 are constituted by members 15a–15g, 16a–16g, 17a–17g, and 18a–18g stated below, respectively.

Reference numerals 15a–18a designate fixed bases, reference numerals 15b–18b designate sliders, which are slidable on the respective fixed bases 15a–18a in the width direction of the respective strips 12 and 13. Reference numerals 15c–18c designate contacting pieces, which are, respectively, fixed to the sliders 15b–18b, and which can contact with a lateral edge of the respective strips 12 and 13. Reference numerals 15d–18d designate cylinders, which are, respectively, fixed to the bases 15a–18a, and which have respective pistons 15e–18e pushed, through respective buffers 15f–18f stated later, the contacting pieces 15c–18c to contact the contacting pieces with the lateral edges of the respective strips 12 and 13. Reference numerals 15f–18f designate the buffers, which are provided between the respective contacting pieces 15c–18c and the respective pistons 15e–18e, and which relieve the impact that is caused when each of the contacting pieces 15c–18c contacts the lateral edge of each of the strips 12 and 13. Reference numerals 15g–18g designate absolute encoders, which are coupled to the respective contacting pieces 15c–18c, and which detect the distance between a contacting position of each of the contacting pieces 15c–18c with the lateral edge of each of the strips 12 and 13 and a preset reference position of each of the contacting pieces 15c–18c as a deviation of each of the strips 12 and 13 with respect to the center line 11 of the processing line.

Reference numerals 19 and 20 designate alignment devices, which are provided to be separated from each other by a certain distance in the transferring direction of the leading strip 12 on the outlet side of the welder 14, and which, respectively, control the position of the leading strip 12 in the width direction in response to the deviation detected by each of the position detectors 15 and 16. Reference numerals 21 and 22 designate alignment devices, which are provided to be separated from each other by a certain distance in the transferring direction of the trailing strip 13 on the inlet side of the welder 14, and which, respectively, control the position of the trailing strip 13 in the width direction in response to the deviation detected by each of the position detectors 17 and 18. The alignment devices 19–22 are, respectively, constituted by members 19a–19h, 20a–20h, 21a–21h, and 22a–22h stated below. Reference numerals 19a–22a designate fixed bases, and reference numerals 19b–22b designate sliders, which are movable on the respective fixed bases 19a–22a in the width direction of the respective strips 12 and 13. Reference numerals 19c–22c designate frames in a C-character shape, which are fixed on the respective sliders 19b–22b, and which are movable on the respective bases 19a–22a in the width direction of the respective strips 12 and 13 through the respective sliders 19b–22b.

Reference numerals 19d–22d designate driving electric motors, which are provided on the respective bases 19a–22a. Reference numerals 19e–22e designate screws, which are engaged with the respective frames 19c–22c, and which are driven by the respective driving electric motors 19d–22d to move the respective frames 19c–22c in the width direction of the respective strips 12 and 13. Reference numerals 19f–22f designate driving sources, such as cylinders, which are provided on the respective frames 19c–22c, and which are moved in the thickness direction of the respective strips 12 and 13. Reference numerals 19g–22g designate pads, which are provided on the respective driving sources 19f–22f, and which are rotatable around an axis in the thickness direction of each of the strips 12 and 13. Reference numerals 19h–22h designate pads, which are mounted to the respective frames 19c–22c, and which are rotatable around an axis perpendicular to the surface of each of the strips 12 and 13. The pads 19g–22g are moved downwardly in FIG. 3 by the respective driving sources 19f–22f to clamp the respective strips 12 and 13 with the respective pads 19h–22h.

Figure 4:
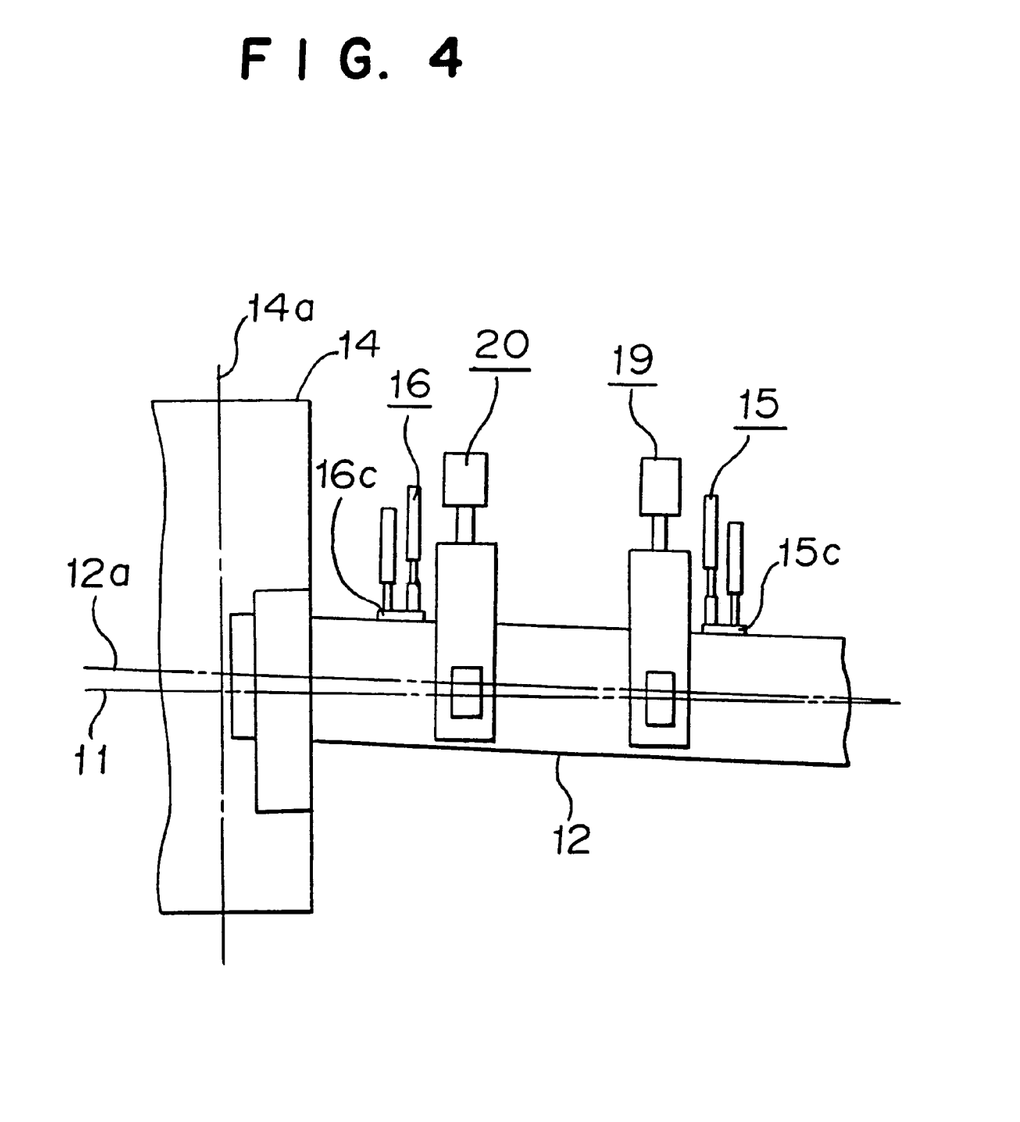
FIG. 4 is a schematic view to explain how the position detectors 15 and 16 of FIG. 1 are operated.

Now, the operation of the connecting apparatus will be explained. In FIG. 4 is shown a schematic view of the operating status of the position detectors 15 and 16. In FIGS. 1 through 4, the tail edge of the leading strip 12, which is successively processed on the processing line, halts in the welder 14. The driving sources 19f–22f of the alignment devices 19 and 20 are driven to clamp the leading strip 12, and the contacting pieces 15c and 16c of the position detectors 15 and 16 contact with the lateral edge of the leading strip 12 as shown in FIG. 4. The impact, which is caused when the contacting pieces 15c and 16c collide with the lateral edge of the leading strip 12, can be absorbed by the buffers 15f and 16f to prevent the lateral edge of the leading strip 12 from being deformed. The respective positions of the lateral edge of the leading strip 12 with respect to the reference positions are detected as deviations. The alignment device 19 and the alignment device 20 are, respectively, actuated in response to the deviation detected by the position detector 15 and the deviation detected by the position detector 16 to align the center line 12a of the leading strip 12 with the center line 11 of the processing line.

When both center lines 11 and 12a are aligned with each other in a case wherein the center line 12a of the leading strip 12 deviates from the center line 11 of the processing line at an angle, the pads 19g and 19h of the alignment device 19 and the pads 20g and 20h of the alignment device 20 have rotational forces applied thereto around the axes perpendicular to the surface of the leading strip 12. The rotational forces can be absorbed by the pads 19g, 19h, 20g and 20h since they are rotatable.

It is assumed that both center line 11 and 12a are aligned at the alignment device 19 for the leading strip 12, and the center line 12a of the leading strip 12 deviates from the center line 11 of the processing line by 10 mm at the alignment device 20 for the leading strip, and that the distance between the alignment devices 19 and 20 is 1,000 mm. In that case, when the alignment device 20 is moved in the width direction of the leading strip 12, the alignment device 20 rotates around the alignment device 19. If the radius of rotation of the alignment device 20 is R, R=100.05 is found in accordance with the equation of $R^2=1,000^2+10^2$. This means that, when the distance between the alignment device 19 and 20 is set to 1,000 mm, the leading strip 12 has a compressive force of 0.05 mm applied thereto in the longitudinal direction, which is a negligible value.

Next, the front edge of the trailing strip 13 halts in the welder 14. As in the leading strip 12, the alignment devices 21 and 22 clamp the trailing strip 13, and the contacting pieces 17c and 18c of the position detectors 17 and 18 contact with the lateral edge of the strip 13. Thus, each of the contacting positions with the lateral edge of the trailing strip 13 is detected as deviations with respect to the reference position. The alignment devices 21 and 22 are actuated in response to the deviation detected by the position detector 17 and the deviation detected by the position detector 18 to align the center line 13a of the trailing strip 13 with the center line 11 of the processing line. In such manner, the center lines 12a and 13a of both strips 12 and 13 are aligned with the center line 11 of the processing line, and the tail edge of the leading strip 12 and the front edge of the trailing strip 13 are connected at the connecting position 14a by the welder 14.

As explained, the deviation of the center line 12a of the leading strip 12 and the deviation of the center line 13a of the trailing strip 13 with respect to the center line 11 of the processing line are detected by the two pairs of position detectors 15–18 for each of the strips, and the positions of the respective strips 12 and 13 in the width direction are adjusted in response to each deviation by the two pairs of alignment devices 19–22 for each of the strips. Thus, the center lines 12a and 13a of both strips 12 and 13 can be aligned with the center line 11 of the processing line to prevent both strips from snaking during transfer after connection.

Embodiment 2

Figure 5:
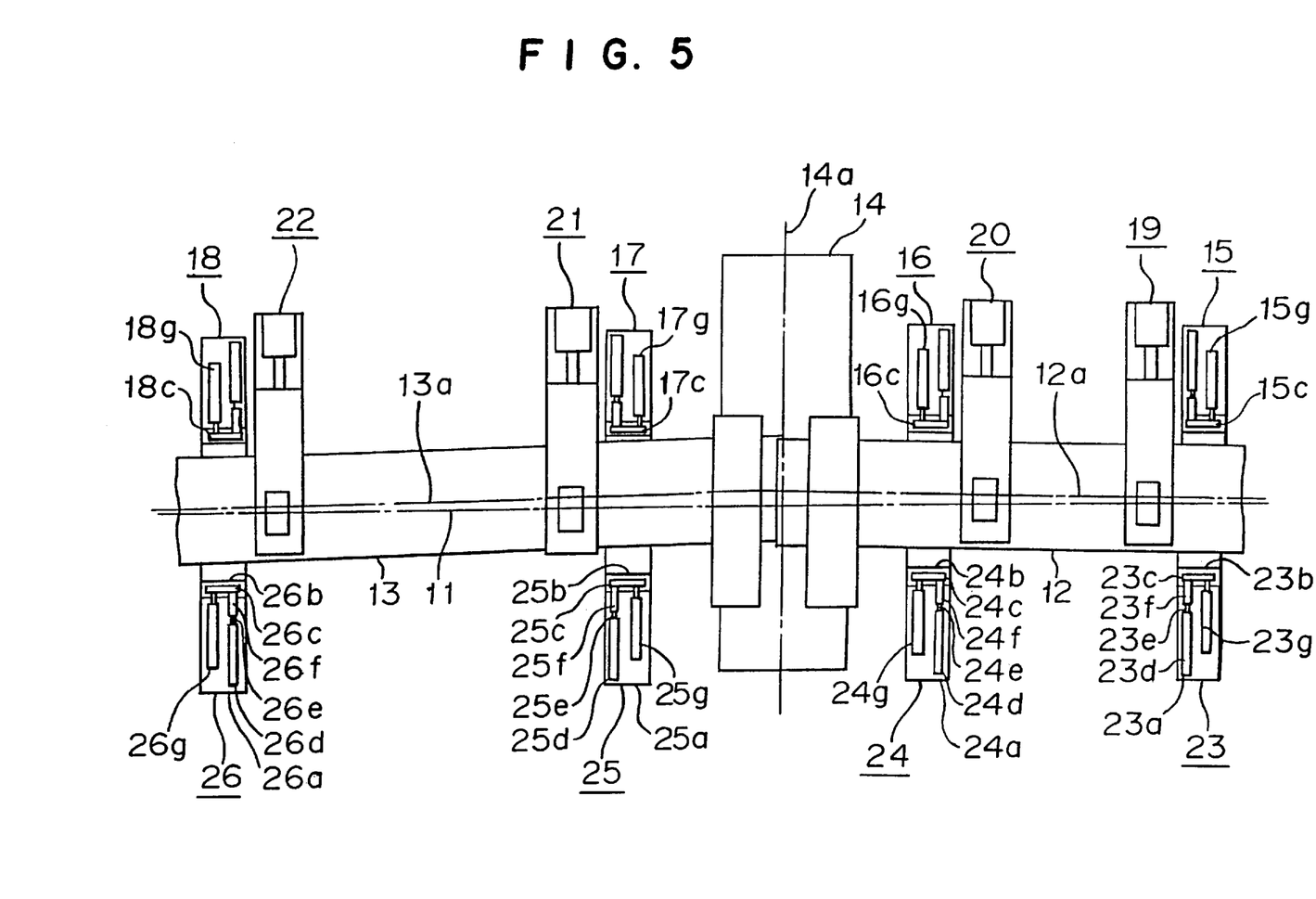
FIG. 5 is a plan view showing the arrangement according to a second embodiment of the present invention.

In FIG. 5 is shown a plan view of the arrangement according to a second embodiment of the present invention. In FIG. 5, the members indicated by reference numerals 11–22 are the same as those according tot he first embodiment. Reference numerals 23 and 24 designates position detectors, which are provided on the outlet side of the welder 14, and are separated from each other by the certain distance in the transferring direction of the leading strip 12 so as to be, respectively, opposite to the position detector 15 and 16, interposing the leading strip 12 therebetween. Reference numerals 25 and 26 designate position detectors, which are provided on the inlet side of the welder 14, and which are separated from each other by the certain distance in the transferring direction of the trailing strip 13 so as to be, respectively, opposite to the position detectors 17 and 18, interposing the trailing strip 13 therebetween. The respective position detectors 23–26 are the same as the position detectors 15–18 in terms of structure. In other words, the position detectors 23–26 are constituted by bases 23a–26a, sliders 23b–26b, contacting pieces 23c–26c, cylinders 23d–26d, pistons 23e–26e, buffer springs 23f–26f, and absolute encoders 23g–26g, respectively.

The operation of the arrangement according to the second embodiment will be explained. Referring now to FIGS. 2, 3 and 5, the tail edge of a leading strip 12, which is successively processed on the processing line, halts in the welder 14. Then, the alignment devices 19 and 20 clamp the leading strip 12, and the contacting pieces 15c, 16c, 23c and 24c of the position detectors 15, 16, 23 and 24 contact with lateral edges of the leading 20 strip 12. Thus, the position detectors 15, 16, 23 and 24 can detect each of the contacting positions on the lateral edges of the leading strip 12 as deviations with respect to the reference position, and can detect the width of the leading strip 12. Next, the alignment device 19 is actuated in response to the deviation detected by the position detector 15 and the deviation detected by the position detector 23 to equalize the deviation detected by the position detector 15 and the deviation detected by the position detector 23. On the other hand, the alignment device 20 is actuated in response to the deviation detected by the position detector 16 and the deviation detected by the position detector 24 to equalize the deviation detected by the position detector 16 and the deviation detected by the position detector 24. Thus, the center line 12a of the leading strip 12 is aligned with the center line 11 of the processing line.

Next, the front edge of the trailing strip 13 halts in the welder 14. As in the leading strip 12, the alignment devices 21 and 22 clamp the trailing strip 13, and the contacting pieces 17c, 18c, 25c and 26c of the position detectors 17, 18, 25 and 26 contact with the lateral edges of the trailing strip 13. As in the leading strip 12, the alignment devices 21 and 22 are actuated to equalize the deviation detected by each of the position detector 17, 25, 18 and 26. Thus, the center line 13a of the trailing strip 13 is aligned with the center line 11 of the processing line. In that manner, the center lines 12a and 13a of the both strips 12 and 13 are aligned with the center line 11 of the processing line, and the tail edge of the leading strip 12 and the front edge of the trailing strip 13 are connected at the connecting position 14a by the welder 14.

As explained, the deviation of the center line 12a of the leading strip 12 and the deviation of the center line 13a of the trailing strip 13 with respect to the center line 11 of the processing line are, respectively, detected by the two pairs of position detectors 15, 23, 16, 24 and the two pairs of position detectors 17, 25, 18, 26, and the positions of the both strips 12 and 13 in the width direction are adjusted in response to the detected deviations by the two pairs of alignment devices 19, 20 and the two pairs of the alignment devices 21 and 22, respectively. Thus, the center lines 12a and 13a of both strips 12 and 13 can be aligned with the center line 11 of the processing line to prevent both strips from snaking during transfer after connection. In this embodiment, the width size of both strips 12 and 13 can be detected since the positions of the lateral edges of both strips 12 and 13 are detected.

Although explanation of the first embodiment and the second embodiment has been made with respect to a case wherein the position detectors 15–18 and 23–26 have the contacting pieces 15c–18c and 23c–26c contacted with the lateral edges of both strips 12 and 13, the lateral edges of both strips 12 and 13 may be detected by photo sensors, offering a similar effect.

Embodiment 3

Figure 6:
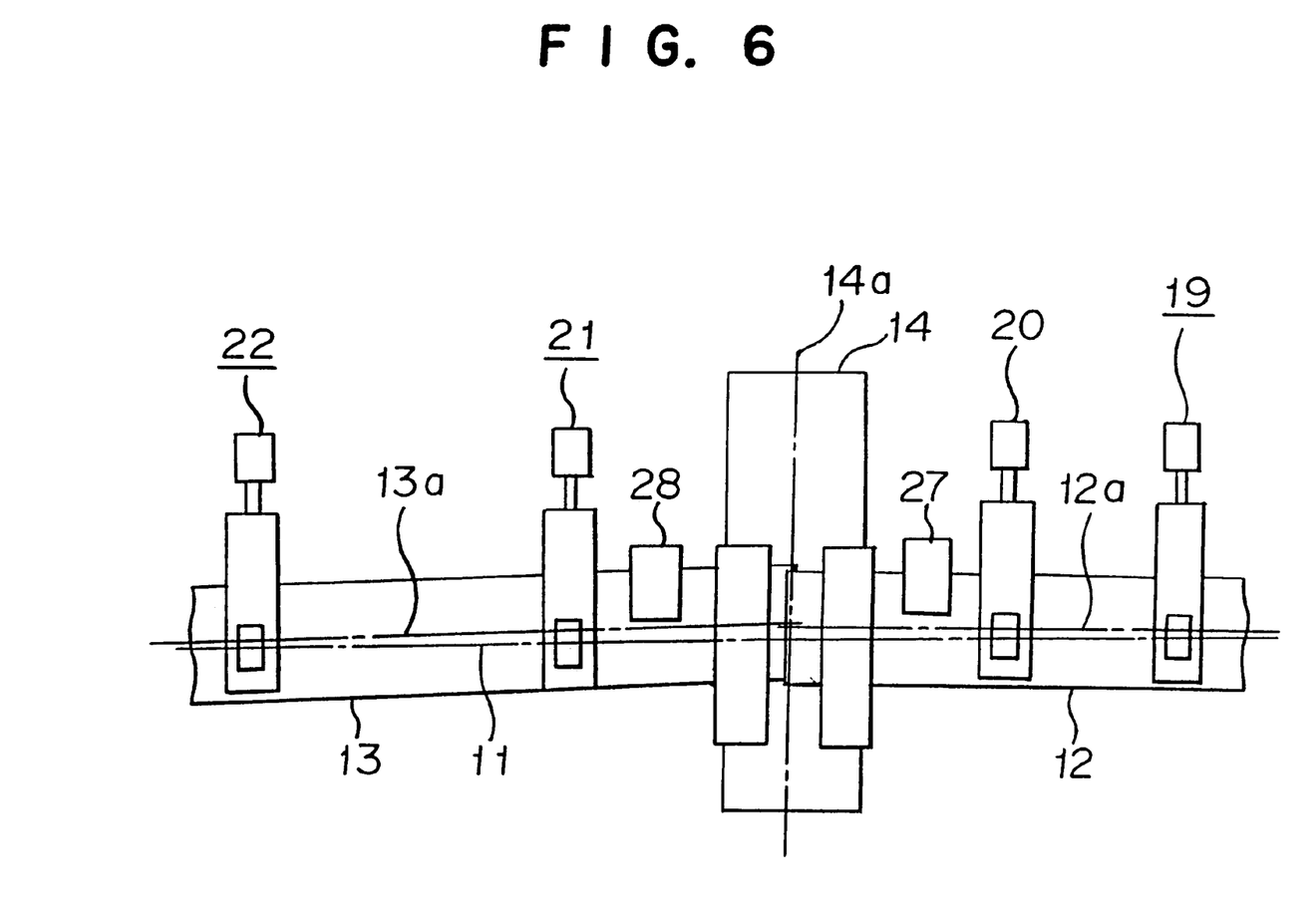
FIG. 6 is a plan view of the arrangement according to a third embodiment of the present invention.

In FIG. 6 is shown a plan view of the arrangement according to a third embodiment of the present invention. In FIG. 6, the members indicated by reference numerals 11–14 and 19–22 are the same as those in the first embodiment. Reference numeral 27 designates a CCD camera for two-dimensional pickup, which is provided on the outlet side of the welder 14, and which detects a lateral edge of the leading strip 12. Reference numeral 28 designates is a CCD camera for two-dimensional pickup, which is provided on the inlet side of the welder 14, and which detects a lateral edge of the trailing strip 12.

Figure 7:
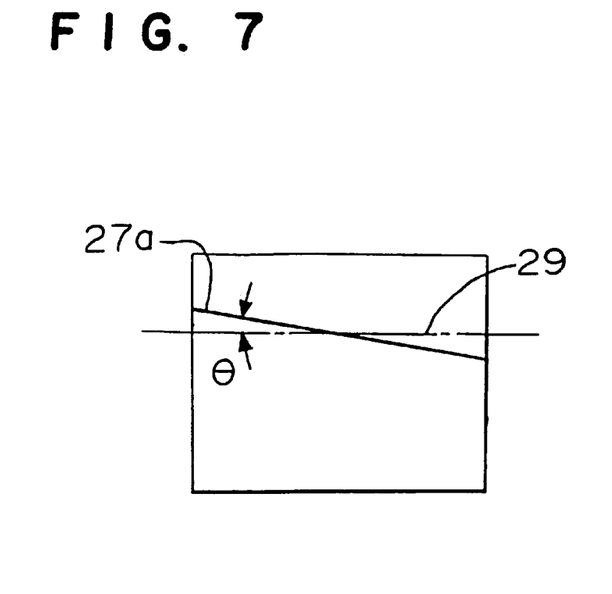
FIG. 7 is a schematic view to show an image taken by a CCD camera of FIG. 6.

The operation of the arrangement according to the third embodiment will be explained. Referring to FIG. 6, when the tail edge of the leading strip 12, which is successively processed on the processing line, halts in the welder 14, the alignment devices 19 and 20 clamp the leading strip 12. The CCD camera 27 detects an image 27a of the lateral edge of the strip 12 as a deviation (an angle θ) with respect to a reference line 29 as shown in FIG. 7. Based on the detected deviation, the alignment devices 19 and 20 are actuated to align the image 27a with the reference line 29. On the other hand, with respect to the deviation for the lateral edge of the trailing strip 13 detected by the CCD camera 28, the alignment devices 21 and 22 are actuated to control the position of the lateral edge of the trailing strip 13.

Thus, the deviation (the angle θ) for each of the strips 12 and 13 is made 0 to align the center lines 12a and 13a of the strips 12 and 13 with the center line 11 of the processing line. As explained, the CCD cameras 27 and 28 can detect the deviation of the center line 12a of the strip 12 and the deviation of the center line 13a of the strip 13 with respect to the center line 11 of the processing line, and the alignment devices 19–22 can adjust the positions of both strips in the width direction to align the center lines 12a and 13a of both strips 12 and 13 with the center line 11 of the processing line, preventing the strips 12 and 13 from snaking during transfer after connection.

Although explanation of the third embodiment has been made with respect to a case wherein the lateral edge of each of the strips 12 and 13 is detected by each of the CCD cameras 27 and 28, additional CCD cameras may be provided so as to be, respectively, opposite to the CCD cameras 27 and 28 with the strips 12 and 13 interposed between the respective pairs and detect both lateral edges of the respective strips, to detect the width size of the respective strips 12 and 13.

Obviously, numerous modifications and deviations of the present invention are possible in light of the above teachings. It is therefore to be understood that within the scope of the appended claims, the invention may be practiced otherwise than as specifically described herein.

The entire disclosure of Japanese Patent Application JP2000-049936 filed on Feb. 25, 2000 including specification, claims, drawings and summary are incorporated herein by reference in its entirety.

What is claimed is:

1. A strip connecting apparatus wherein a leading strip and the trailing strip have centers thereof in a width direction aligned with each other, and the leading strip has a tail edge welded to a front edge of the trailing strip, comprising:

a position detector for the leading strip and a position detector for the trailing strip, each of the position detectors being provided along each of the strips to detect a deviation of a center line of each of the strips in the width direction with respect to a center line of a processing line; and at least two alignment devices for the leading strip and at least two alignment devices for the trailing strip, the alignment devices for the leading strip and the alignment devices for the trailing strip being provided so as to be separated from each other by a certain distance along each of the strips in a transferring direction of the strips, and each of the alignment devices clamping each of the strips and adjusting a position of each of the strips in the width direction in response to each of the detected deviations to align the center line of each of the strips with the center line of the processing line, wherein each of the position detector for the leading strip and the position detector for the trailing strip comprises two position detectors, which are provided so as to be separated from each other by a certain distance in the transferring direction, wherein each of the positions detectors has a contacting piece provided thereon so as to be capable of contacting with a lateral edge of a strip for detection of the deviation, and the contacting piece has a buffer to absorb impact in the width direction, which is caused when the contacting piece contacts with the lateral edge.

2. A strip connecting apparatus wherein a leading strip and the trailing strip have centers thereof in a width direction aligned with each other, and the leading strip has a tail edge welded to a front edge of the trailing strip, comprising:

a position detector for the leading strip and a position detector for the trailing strip, each of the position detectors being provided along each of the strips to detect a deviation of a center line of each of the strips in the width direction with respect to a center line of a processing line; and at least two alignment devices for the leading strip and at least two alignment devices for the trailing strip, the alignment devices for the leading strip and the alignment devices for the trailing strip being provided so as to be separated from each other by a certain distance along each of the strips in a transferring direction of the strips, and each of the alignment devices clamping each of the strips and adjusting a position of each of the strips in the width direction in response to each of the detected deviations to align the center line of each of the strips with the center line of the processing line, wherein each of the position detector for the leading strip and the position detector for the trailing strip, respectively comprises two pairs of position detectors, each pair being provided so as to interpose each of the strips therebetween, wherein each of the positions detectors has a contacting piece provided thereon so as to be capable of contacting with a lateral edge of a strip for detection of the deviation, and the contacting piece has a buffer to absorb impact in the width direction, which is caused when the contacting piece contacts with the lateral edge.

3. A strip connecting apparatus wherein a leading strip and the trailing strip have centers thereof in a width direction aligned with each other, and the leading strip has a tail edge welded to a front edge of the trailing strip, comprising:

a position detector for the leading strip and a position detector for the trailing strip, each of the position detectors being provided along each of the strips to detect a deviation of a center line of each of the strips in the width direction with respect to a center line of a processing line; and at least two alignment devices for the leading strip and at least two alignment devices for the trailing strip, the alignment devices for the leading strip and the alignment devices for the trailing strip being provided so as to be separated from each other by a certain distance along each of the strips in a transferring direction of the strips, and each of the alignment devices clamping each of the strips and adjusting a position of each of the strips in the width direction in response to each of the detected deviations to align the center line of each of the strips with the center line of the processing line, wherein each of the position detector for the leading strip and the position detector for the trailing strip comprises two position detectors, which are provided so as to be separated from each other by a certain distance in the transferring direction, wherein the respective alignment devices have a pair of pads provided thereon so as to be capable of contacting with both surfaces of each of the strips, and the pads are rotatable around an axis perpendicular to the surfaces of each of the strips, wherein each of the positions detectors has a contacting piece provided thereon so as to be capable of contacting with a lateral edge of a strip for detection of the deviation, and the contacting piece has a buffer to absorb impact in the width direction, which is caused when the contacting piece contacts with the lateral edge.

4. A strip connecting apparatus wherein a leading strip and the trailing strip have centers thereof in a width direction aligned with each other, and the leading strip has a tail edge welded to a front edge of the trailing strip, comprising:

a position detector for the leading strip and a position detector for the trailing strip, each of the position detectors being provided along each of the strips to detect a deviation of a center line of each of the strips in the width direction with respect to a center line of a processing line; and at least two alignment devices for the leading strip and at least two alignment devices for the trailing strip, the alignment devices for the leading strip and the alignment devices for the trailing strip being provided so as to be separated from each other by a certain distance along each of the strips in a transferring direction of the strips, and each of the alignment devices clamping each of the strips and adjusting a position of each of the strips in the width direction in response to each of the detected deviations to align the center line of each of the strips with the center line of the processing line, wherein each of the position detector for the leading strip and the position detector for the trailing strip, respectively comprises two pairs of position detectors, each pair being provided so as to interpose each of the strips therebetween, wherein the respective alignment devices have a pair of pads provided thereon so as to be capable of contacting with both surfaces of each of the strips, and the pads are rotatable around an axis perpendicular to the surfaces of each of the strips, wherein each of the positions detectors has a contacting piece provided thereon so as to be capable of contacting with a lateral edge of a strip for detection of the deviation, and the contacting piece has a buffer to absorb impact in the width direction, which is caused when the contacting piece contacts with the lateral edge.

* * * * *